United States Patent

Fukunaga et al.

[11] Patent Number: 6,144,993
[45] Date of Patent: Nov. 7, 2000

[54] BUILDING AUTOMATION SYSTEM USING COMMON PLATFORM PROGRAM AND COMMON FUNCTION PACKAGE FOR CONTROLLING FACILITY LOADS AND MONITORING TERMINALS

[75] Inventors: Masaichi Fukunaga; Kazumasa Murakami, both of Kadoma, Japan

[73] Assignee: Matsushita Electric Works, Ltd., Osaka, Japan

[21] Appl. No.: 08/980,870

[22] Filed: Dec. 1, 1997

[30] Foreign Application Priority Data

Nov. 29, 1996 [JP] Japan .................................. 8-320610
Jul. 28, 1997 [JP] Japan .................................. 9-201779
Sep. 30, 1997 [JP] Japan .................................. 9-267258

[51] Int. Cl.[7] ........................... G06F 15/16; G06F 15/173
[52] U.S. Cl. ......................................... 709/208; 709/224
[58] Field of Search .................................. 320/252, 400, 320/396, 398, 241; 709/224, 222, 208; 370/225

[56] References Cited

U.S. PATENT DOCUMENTS 5,463,735 10/1995 Pascucci et al. ........................ 709/222
5,682,476 10/1997 Tapperson et al. ...................... 370/225

Primary Examiner—Le Hien Luu
Attorney, Agent, or Firm—Burns, Doane, Swecker & Mathis, L.L.P.

[57] ABSTRACT

A building automation system is constituted by a distributed process controller which includes a common platform, per-usage package, and common function package, and the common platform is provided with a mechanism which can standardize a service program for operating and controlling hardwares mainly with CPU irrespective of their scale and usage and can prepare all data transmission for local transmission with the same program function, the mechanism being commonly utilizable in air conditioning and fire alarm system, to render the administration system easily expandable and flexible in system arrangement.

6 Claims, 13 Drawing Sheets

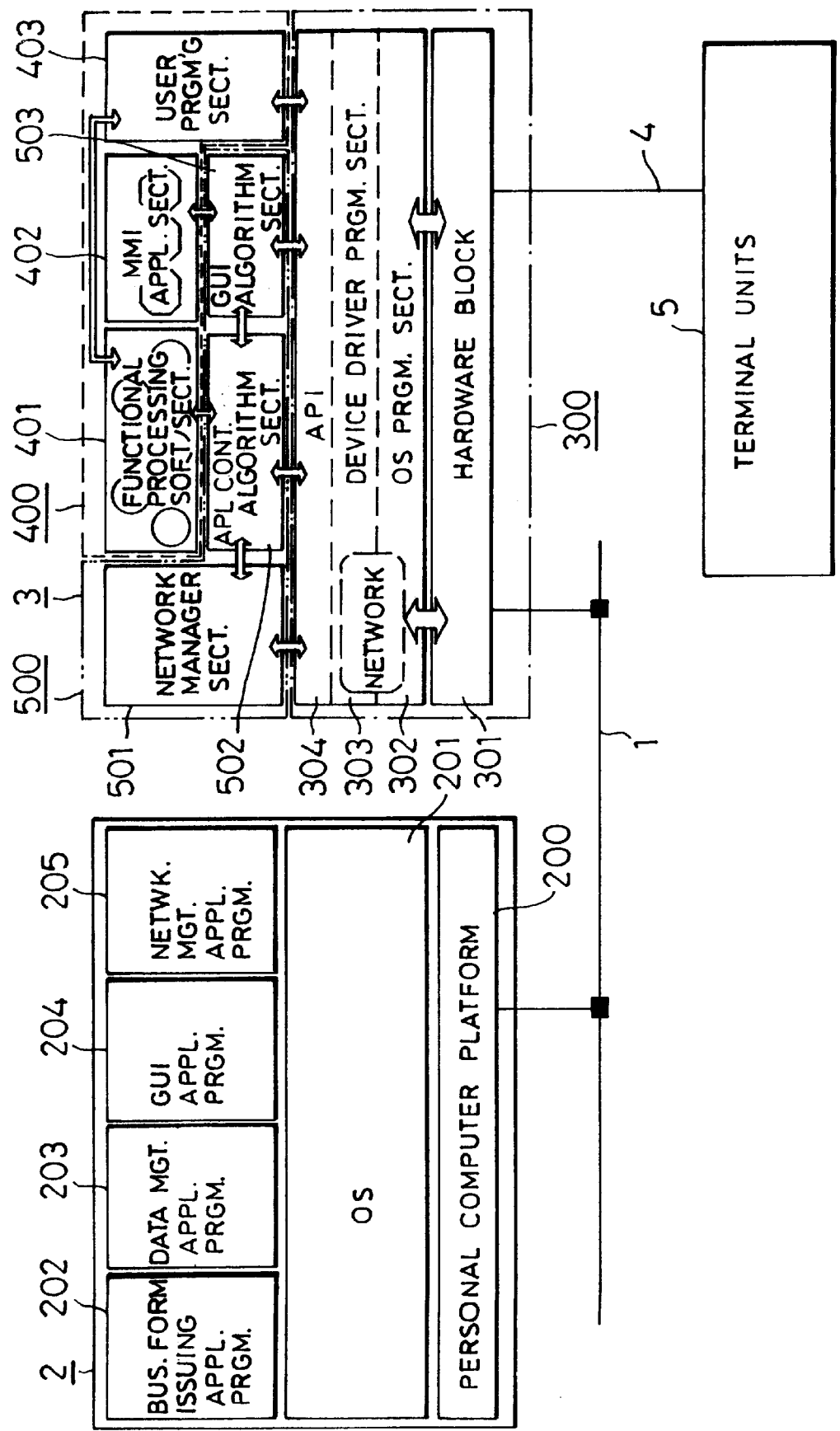

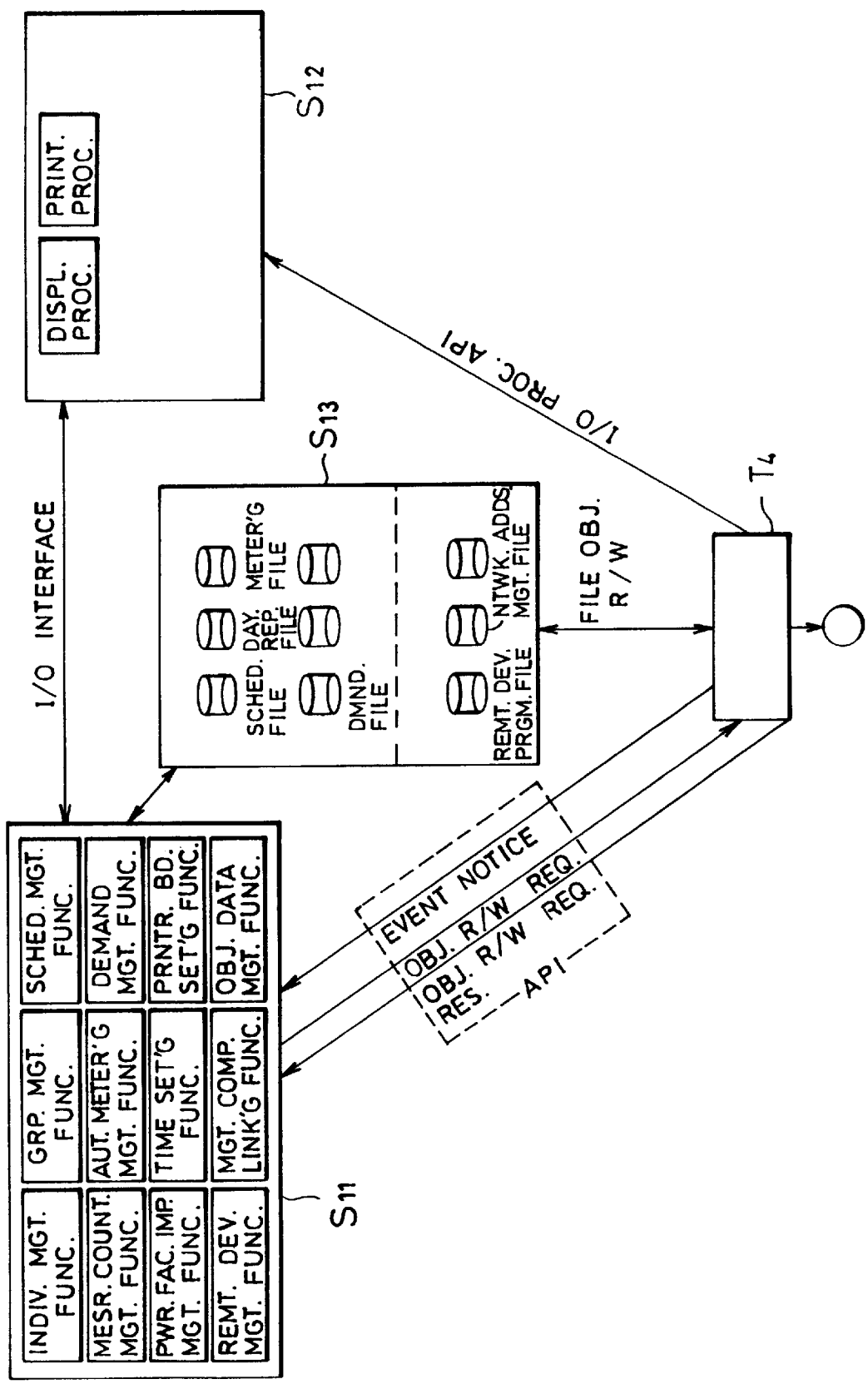

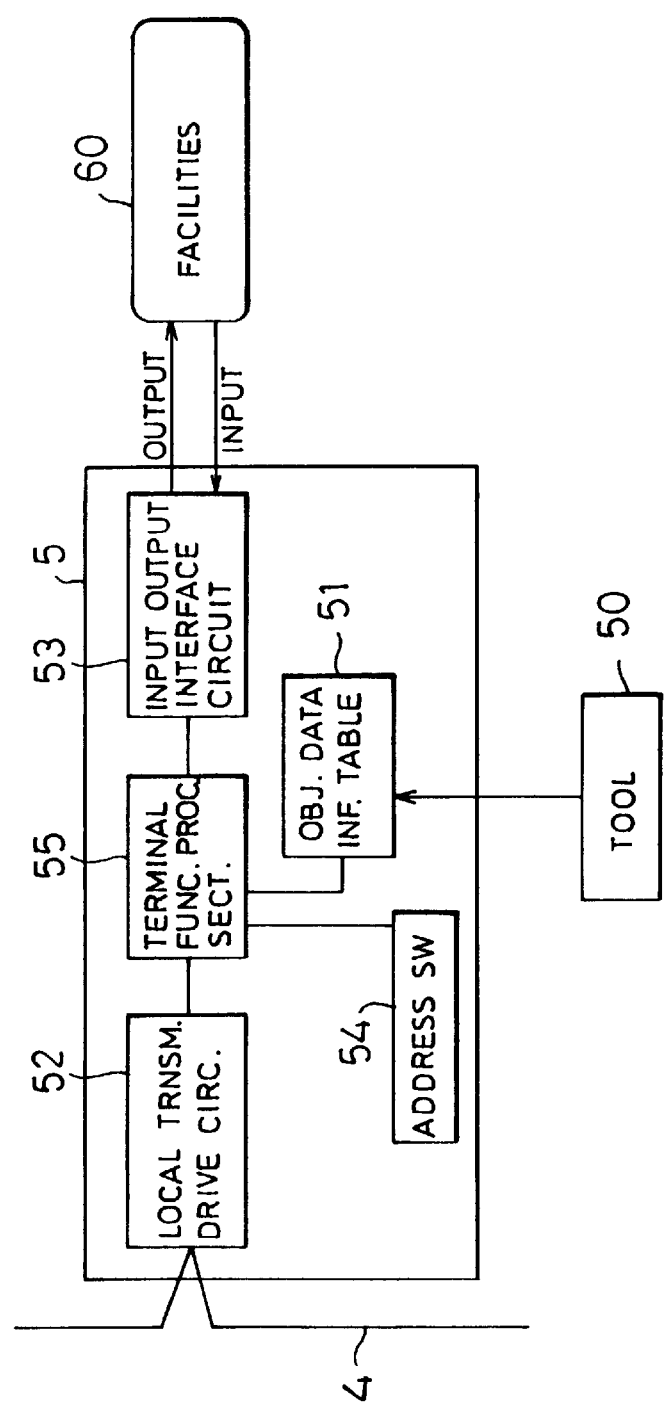

| CLASS. OF TYPE | CLASS. OF SERVICE | DEMAND FACTOR | SOURCE ADD. | DESTIN. ADD. | DATA LENGTH | FACIL. CLASS. DATA | DATA |

| ADDR. | FACIL. CLASS. DATA | DATA | RETN. WAIT. TIME |
| AD | BD | CD | WT |

BUILDING AUTOMATION SYSTEM USING COMMON PLATFORM PROGRAM AND COMMON FUNCTION PACKAGE FOR CONTROLLING FACILITY LOADS AND MONITORING TERMINALS

BACKGROUND OF THE INVENTION

This invention relates to a building automation system and, more specifically, to a system of centralized administration for various facilities of buildings with a system administration computer employed.

DESCRIPTION OF RELATED ART

For the building automation system, there has been known an arrangement in which a system management computer employing a work station or a personal computer as well as a distributed process controller (ADPC) are connected to a LAN constructed with, for example, 10 BASE (10 BASE-T, 10 BASE-5 and 10 BASE-2) employed and with TCP/IP as PROTOCOL, and various terminals of various building administrating facilities are connected through a control signal line to the distributed process controller.

In this case, the distributed process controller calls sequentially the various terminals by means of time-division multiplex transmission signals to have a facility load controlled, which load being connected to the terminal to be controlled, with control data provided to the controlled terminal, while a monitoring terminal is caused to reply, in a reply period included in the transmission signals, current state of such signal input element as a sensor, switch or the like, received in connection with the signals upon being called. Further, the arrangement is so made that the data of this monitoring terminal are sent through LAN or the like to any other distributed process controller or system management computer, or control data to be sent to a predetermined controlling terminal in the own distributed processing series are produced in response to the data from the monitoring terminal in the own distributed processing series or from any other distributed process controller, or to the data from the system management computer.

Here, the foregoing building automation system is corresponding to a large scale building, and the distributed process controllers can be provided respectively separately in correspondence to every facility of the building management. For example, one of the distributed process controllers is used for monitoring and controlling power supply facilities, connecting to its control signal line a pump operation controlling terminal, a distribution-board-use terminal for gathering operating signals for controlling the pump operation and so on. Another distributed process controller is used for monitoring and controlling lighting facilities, to control signal line of which a relay controlling terminal for turning lighting loads ON and OFF, monitoring terminal with respect to operating switches for the lighting loads and so on are connected. Another distributed process controller is used for monitoring and controlling fire alarm facilities, connecting to its control signal line monitoring terminals of fire sensor, gas sensor and the like or controlling terminals for controlling such fire alarming equipments as smoke discharger and so on. Another distributed process controller is used for monitoring and controlling security facilities, connecting to its control signal line a control terminal for opening and closing a door to key box accommodating keys to respective rooms of tenants, controlling terminal for opening and closing electric locks, monitoring terminal for gathering data read out of magnetic card or the like to open and close the key box door, and so on. Further distributed process controller is employed for monitoring and controlling air conditioning facilities, connecting to its control signal line a controlling terminal with respect to an air conditioner, monitoring terminals for gathering detected data of temperatures sensor and set data of air-conditioning temperature setter, and so on.

In this building automation system, the system management computer performs the administration and monitoring of the entire system while the distributed process controllers are respectively to monitor and control their own system, on the premise, so that, even upon occurrence of any trouble in any other system of other distributed process controller, the respective distributed process controllers can maintain the monitoring and controlling operation of their own system independently, and the arrangement is so made also that the distributed process controllers can operate as interlocked with each other by giving and receiving the data through other distributed process controller and LAN.

In the case of a building of small or middle scale, it is possible to arrange a single distributed process controller for the monitoring and controlling of a plurality of facilities of different systems.

The foregoing distributed process controller is actuated mainly with, for example, a predetermined application program so that the controller will be processed and worked as shifted once to the corresponding application program corresponding to the data processed, when respective data for being exchanged with processing sections of network service with respect LAN processing, time division multiplex transmission service on through service, or for processing the data of management point, parameter data and working data for use in controlling and monitoring. For this reason, the data have been respectively in a form allowing the respective application programs to be easily handled, and has not been of a unified processing at all.

Consequently, there has been a problem that any functional upgrading or improvement is required to be attained in a pair of the respective application programs and the data, an influence on other program becomes remarkable, and the functional upgrading or improvement is not easy.

In known arrangement of the distributed process controller, the arrangement is made with inclusion of an application program having a program section of such system application function as air-conditioning control, fire alarm monitoring or the like and also defining required data for the monitoring, control and working, and of a per-usage platform which may be constituted by such hardware block as CPU, memory, peripheral interface or the like, operating system program which enables real time multitask processing on the hardware block, device driver program section for performing the control of networks, input/output devices, transmission interface and so on, application program interface including service program allowing the hardware block to be controlled and operated in simple manner from the application program, and the like. The respective constituting elements for the per-usage platform as in the above have been designed separately in correspondence to every usage of the system (such as the air conditioning or fire alarm system) or to every scale (such as large, middile and small scales), so that the data structure has been also required to be designed separately for every usage and is caused to be complicated as prepared for every usage with the application program to be processed in similar manner. Further, in the event where an optimum designing is made for a per-usage system in a certain specification, a remarkable alteration is required in altering the upgrading of CPU and input/output interface. Further, instead of the sense of preparing a software on the platform of a ready-made personal computer, it has been an image that a new personal computer has been prepared for every usage.

SUMMARY OF THE INVENTION

When the system is built by employing a distributed process controller which is prepared for every usage and operates with a run control performed by the application program as has been described, there arises a problem that the system is less flexible and cannot be easily expanded.

Accordingly, an object of the present invention is to overcome the foregoing problems and to provide a building automation system which is made easily expandable and flexible in the system arrangement.

According to the present invention, the above object can be realized by means of a building automation system in which a system management computer and distributed process controllers are connected through a network, to which distributed process controllers a controlling terminal for facility load or a monitoring terminal for the state of such input element as a sensor, switch or the like are connected through a control signal line, and the monitoring and controlling of the respective terminals or the giving and receipt of monitoring data and control data as to building facilities are performed by the distributed process controllers through the network between the system management computer and the distributed process controllers as well as mutually between the respective distributed process controllers, wherein the distributed process controllers respectively comprise a common platform in which programs capable of operating and controlling hardwares are standardized, a common function package functioning to deliver data to one of object data and event data as well as an application program performing a processing on the basis of the one of the object and event data, and a per-usage package comprising application programs respectively for every usage and exchangeable in accordance with the usage and scale of the system.

Other objects and advantages of the present invention shall become clear as the description of the invention advances as detailed with reference to preferred embodiments shown in accompanying drawings.

BRIEF DESCRIPTION OF THE DRAWINGS

FIG. 1 is a diagram of configuration of the hardwares and softwares in the system management computer and a distributed process controller according to the present invention;

FIG. 7 is a conceptual diagram showing details of the data configuration and data flow in the system management computer;

FIG. 8 is an explanatory view for a format of communication data;

FIG. 9 is a configuration diagram of a terminal in a second embodiment according to the present invention;

Figure 1A:
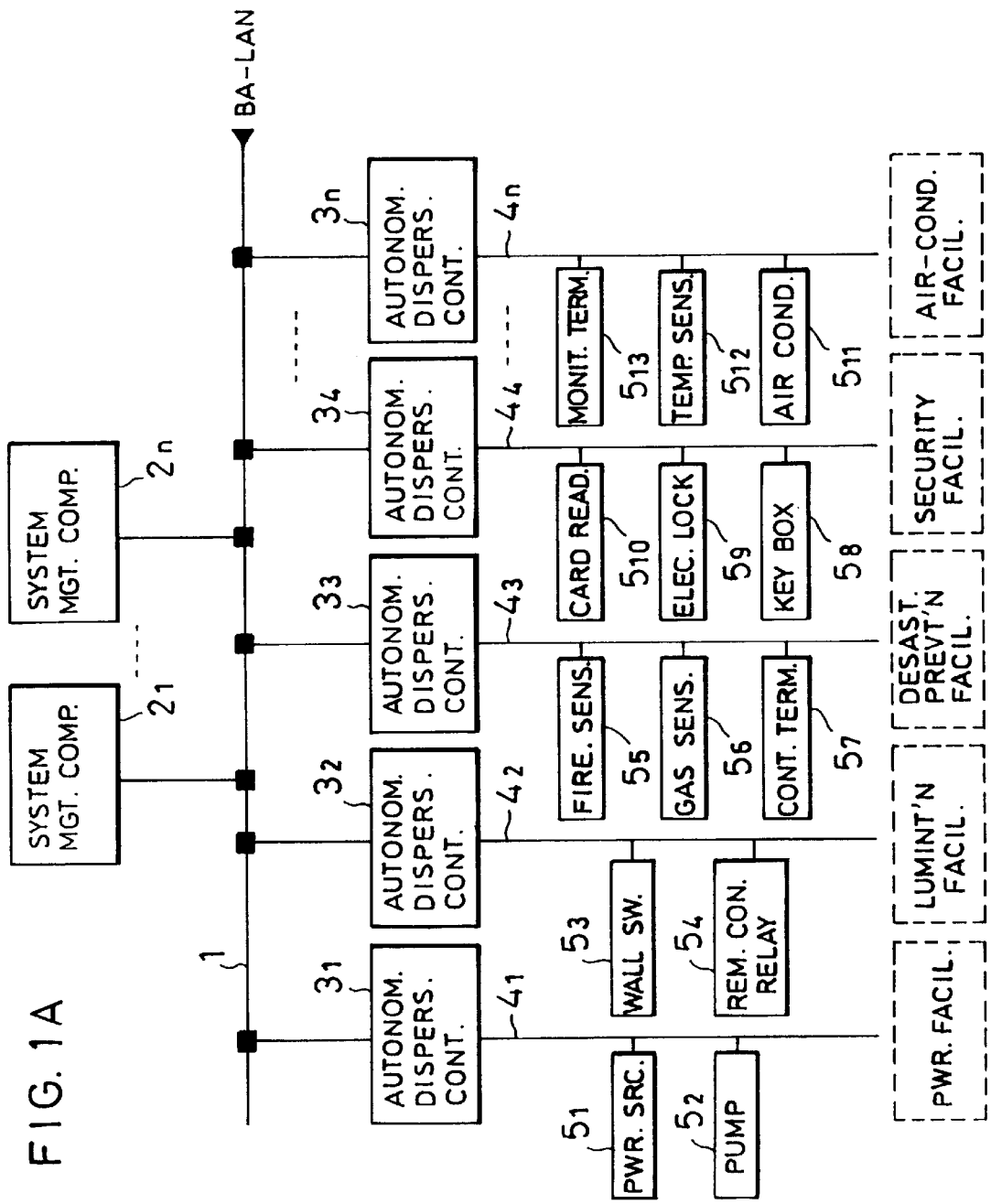
FIG. 1A is a basic, entire block circuit diagram of the building automation system employing the configuration of FIG. 1.

While the present invention shall now be described with reference to preferred embodiments shown in the drawings, it should be appreciated that the intention is not to limit the present invention only to the embodiments shown but rather to include all alterations, modifications and equivalent arrangements possible in the scope of appended claims.

DETAILED DESCRIPTION OF THE PREFERRED EMBODIMENTS

In the followings, the embodiments of the present invention are described with reference to the drawings. FIG. 1 shows schematically a system management computer 2 and a distributed process controller 3 according to the present invention.

Embodiment 1:

The building automation system employing the configuration of FIG. 1 is shown in FIG. 1A, in which the system management computers $2_1$–$2_n$ employing a work station, personal computer or the like are connected to a LAN 1 built with, for example, 10 BASE (10 BASE-T, 10 BASE-5 or 10 BASE-2) and with such proper PROTOCOL as TCP/IP or the like employed, together with the distributed process controllers $3_1$–$3_n$ to which various terminals $5_1$–$5_{13}$ are connected through control signal lines $4_1$–$4_n$.

The distributed process controllers $3_1$–$3_n$ respectively call sequentially the various terminals by means of time division multiplex transmission signals, to cause a controlling terminal to perform a control of a facility load connected with control data provided to the terminal, and also to cause a monitoring terminal, upon being called, to return the state of such input elements as a sensor, switch and the like connected to the terminal during a return signal period provided in the transmission signals, so that the data of this monitoring terminal will be sent through the LAN 1 to other distributed process controllers $3_1$–$3_n$ or the system management computers $2_1$–$2_n$, or a control data to be sent to a predetermined controlling terminal within the own distributed processing system will be prepared in correspondence to a data from another monitoring terminal in the own distributed processing system or from any other distributed process controller or a data from the system management computer $2_1$–$2_n$.

The system in this aspect shown here is to cope with a large scale building, and the distributed process controllers $3_1$–$3_n$ are provided respectively for every one of various building management facilities, such that the distributed process controller $3_1$ corresponds to powering facilities, to the control signal line $4_1$ between which a pump operation controlling terminal $5_2$, power distribution board terminal $5_1$ for receiving operating signals for a pump operation control and the like are connected, and the distributed process controller $3_2$ corresponds to lighting facilities, to the control signal line $4_2$ between which a relay controlling terminal $5_4$ for turning ON and OFF lighting loads and monitoring terminal $5_3$ corresponding to switches for operating the lighting loads are connected. Further, the distributed process controller $3_3$ corresponds to fire alarm facilities, to the control signal line $4_3$ between which a monitoring terminal $5_5$ for a fire sensor, monitoring terminal $5_6$ for a gas sensor and the like monitoring terminals and controlling terminal $5_7$ for controlling such fire alarm equipments as smoke discharger and the like are connected. Further, the distributed process controller $3_4$ corresponds to security facilities, to the control signal line $4_4$ between which a controlling terminal $5_8$ for controlling the opening and closing of a door of key-box in which keys to tenants' rooms are housed, for example, a controlling terminal $5_9$ for opening and closing electric locks, and a monitoring terminal $5_{10}$ gathering data of a card reader of magnetic card or the like for opening and closing the door of key-box are connected. Still further, the distributed process controller $3_n$ corresponds to air-conditioning facilities, to the control signal line $4_n$ between which a controlling terminal $5_{11}$ for controlling air-conditioners, monitoring terminal $5_{12}$ for receiving detected data of temperature sensor, and monitoring terminal $5_{13}$ for receiving set data of air-conditioning temperature setter are connected.

The pesent building automation system is arranged on the premise that the administration and monitor or supervision of the entire system are performed at the system management computers $2_1$–$2_n$, and the distributed process controllers $3_1$–$3_n$ respectively carry out the monitoring and controlling of their own system so as to be capable of maintaining the monitoring and controlling operation independently even when, for example, any trouble has occurred in the system of any other distributed process controller, whereas an interlocking operation may also be executed by the giving and receiving of data through the LAN line with respect to other distributed process controllers.

In the case of a building of a smaller scale or of a middle scale, the system may be so arranged as to monitor and control a plurality of facilities of different systems with a single distributed process controller 3.

In that event, as shown in FIG. 1, the system management computer 2 is loaded, on its personal computer platform 200, with an operating system (OS) 201 (such as Windows NT, manufactured by Microsoft), and various application programs 202–205 for business form issuing, data management, GUI and network management, and the distributed process controller 3 generally comprises a common platform 300, a per-usage package 400 consisting of application programs respectively for every one of various usages, and a common function package 500.

The common platform 300 is loaded with a standardized service program (API) which operates and controls hardwares including mainly CPU, irrespective of the scale and usage, and is provided with a mechanism capable of performing all data transmission for local transmission (transmission to each terminal unit 5) by calling the same program function, so as to be commonly employable in both of air conditioning and fire alarm systems. This common platform 300 comprises, as also shown in FIG. 1, a hardware block 301 of the distributed process controller 3 and constituted by CPU, memory, peripheral interface and the like, an operating system (OS) program section 302 which enables a real time multitask processing on the hardware block 301, a device driver program section 303 for controlling a network device, input/output device, transmission interface and the like, and an application program interface (API) 304 formed by a service program section for rendering the hardware block 301 to be simply controlled and operated as viewed from the application program.

The per-usage package 400 is of a configuration which forms part of layers of application program and is different depending on the scale and usage, and comprises a per-function processing soft section 401, man machine interface (MMI) application section 402 and user programming section 403. The per-function processing soft section 401 is formed separately for every basic function of respective modules for performing a building automation (BA), and for realizing the air conditioning and fire alarm systems by combining these modules. For this reason, the softwares having the same algorithm such as a schedule control is formed with one module, and then they may be commonly employed.

Further, a partial upgrading and improvement of the function can be realized simply by replacing a program module having the particular function, and any large scale work of correction and modification can be avoided. Further, even when any parts of the hardwares are changed, the specification of API on the application side does not vary, and the application modules can be used successively. The MMI application section 402 is a program used when the man machine interface function is added to the distributed process controller 3 itself, and is to realize such man machine interdace function as the management systems for the air conditioning, fire alarm and the like.

The user programming section 403 is a program module which the user can incorporate when the user's demand cannot be realized only with the combination of the per-usage packages, and a program prepared externally of the distributed process controller 3 is incorporated.

The common function package 500 is of a configuration which forming part of layers of the application program, and is constituted irrespective of the scale and usage, which comprise a network manager section 501, APL (Application) control algorithm section 502, and graphical user interface (GUI) algorithm section 503.

The network manager section 501 is constituted by a standard service software (such as a software which confirms, at an application level, that the data from any application has reached the system management computer 2) used in transmitting and receiving the data between the application of the distributed process controller 3 and the system management computer 2 through the LAN 1.

The APL control algorithm section 502 comprises an algorithm program for controlling to which module an input data should be provided as an output when the data (object data, event data) existing on the system (on LAN and local transmission, inside the distributed process controller 3) are received as an input. The GUI algorithm section 503 is substantially of the same configuration as the APL control algorithm section 502, but its objective input/output data is not an object data nor event data, and the section is provided for processing such data of man/machine interface system as a key operation input, display output to a liquid crystal display or the like.

Figure 2:
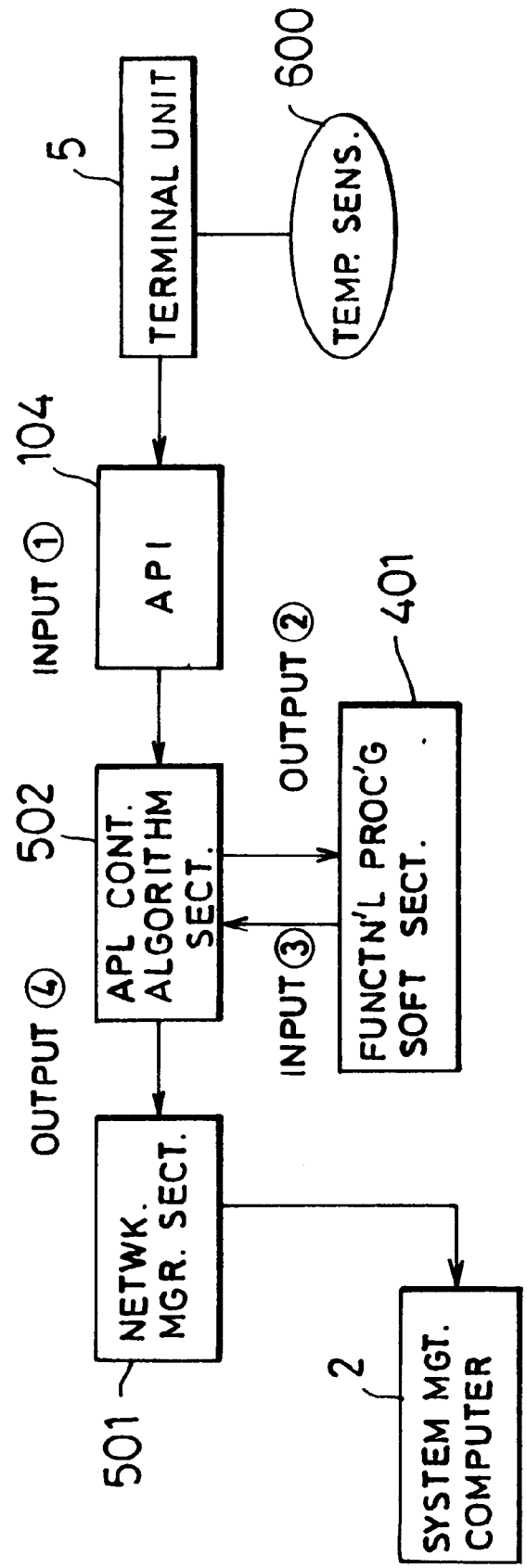
FIG. 2 is an explanatory block diagram of the operation of a control algorithm section in the system management computer of FIG. 1.

Referring here to the function of the above APL control algorithm section 502 with reference to an aspect shown in FIG. 2, a temperature data from a on-the-spot temperature sensor 600 connected to the monitoring terminal 5 is provided as an input to the APL control algorithm section 502 through the API 104 by means of the local transmission, as shown an INPUT ①. In the APL control algorithm section 502, a decision to which module of the per-function processing soft section 401 the input temperature data (a sort of object data later described) should be delivered is made, and the data is delivered to the corresponding module as shown at OUTPUT ②. When it is decided that the delivered temperature data to the soft section 401 shows an abnormal temperature and is to be notified to the system management computer 2, an event data is provided again to the APL control algorithm section 502, as shown at INPUT ③.

Further, as shown at OUTPUT ④, the APL control algorithm section 502 decodes from the event data to which one of the system management computers 2 the notification should be made, and provides to the network manager section 501 a request for transmission. The APL control algorithm section 502 is provided with such algorithm as has been described, and is so arranged as to deliver the object data or event data to the application program for processing such data.

On the other hand, the per-function processing soft section 401 is so constituted that, in the case when the object data or event data are delivered from the foregoing APL control algorithm section 502, these data are processed at a program module having a predetermined function, a new inner event is provided to be delivered to another program module when another processing is required, so that the respective operation will be sequentially executed until the required processing is completed (until the inner event to be processed is exhausted).

Figure 3:
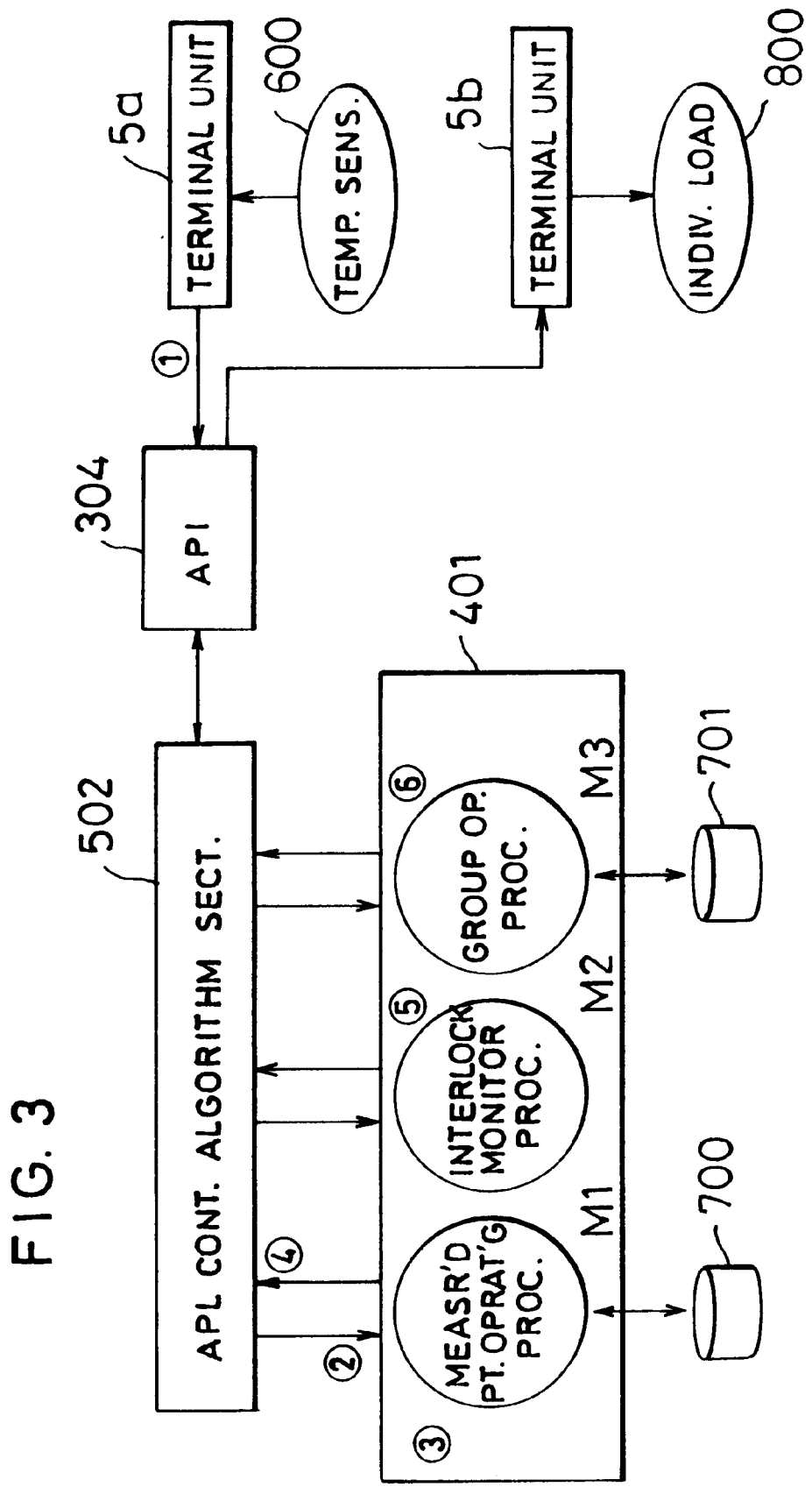
FIG. 3 is an explanatory block diagram of the operation of a function processing soft section in the system management computer of FIG. 1.

Referring in the followings more specifically to the operation of this per-function processing soft section 401 with reference to FIG. 3, an example of measures for reading measured data and controlling equipments in a set group when the read data exceed an upper limit is shown.

In the operation, (1) API 304 reads a measured data of a temperature sensor 600 (for example, a room temperature 25° C.) from the monitoring terminal unit 5a in accordance with the local transmission by means of the multiplex transmission, and (2) the measured data which corresponding to one object data is delivered to a program module M1 which processes the data at a managing points of measuring the temperature or the like provided in the per-function processing soft section 401, through the APL control algorithm section 502.

(3) The program module M1 for processing the data at managing points for the measuring stores this temperature data of 25° C. at a data base 700, and performs a comparison processing in an event where upper and lower limits of the data are set.

(4) When the upper limit is set to be 24° C., the data is decided to be an occurrence of abnormal data, and the inner event is issued (specific contents are housed in an event control sheet later described).

(5) This inner event is delivered to a program module M2 which performs an interlocked monitoring (control). This program module M2 receives this inner event (interlock event) and issues a control event to a preliminarily set starting group load, in response to an interlocking event. (6) The control event issued is delivered to a program module M3 of group operation processing for the group control, a required equipment information is read out of a data table of loads preliminarily registered in an interlocking object data base 701, and issues a control request for ON or OFF.

Receiving this control request, the APL control algorithm section 502 sends a control signal to the controlling terminal unit 5b according to the local transmission through the API 304, and an individual load 800 is controlled. Since the arrangement is so made that, at the distributed process controller 3 of the present invention, the common platform 300, per-usage package 400 and common function package 500 are combined, the various systems can be dealt with highly efficiently, while allowing any partial amendment and addition of function rendered to be easy.

The present invention shall be further described in the followings with reference to concrete embodiments of the invention.

Figure 4:
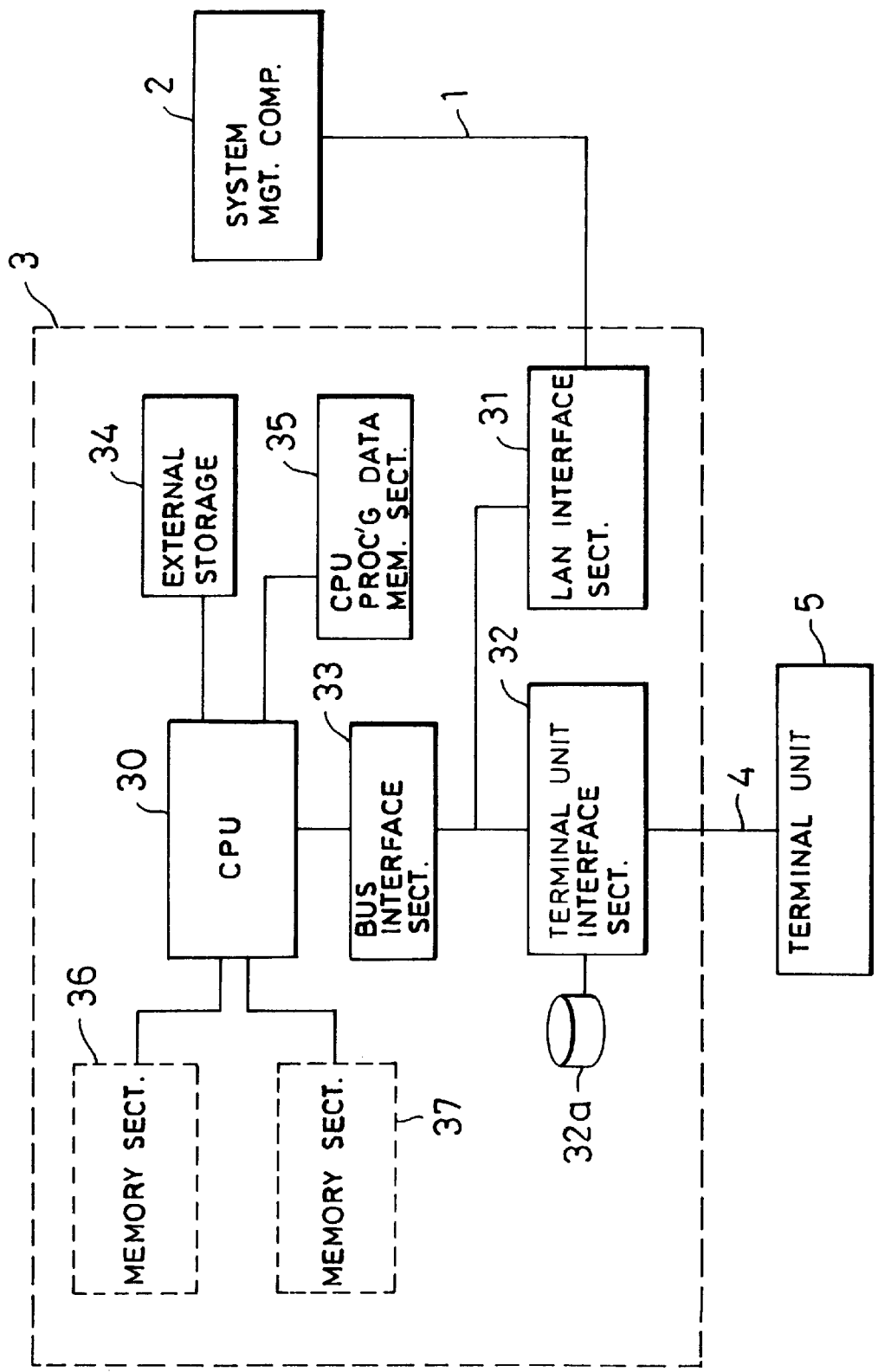
FIG. 4 is a block circuit diagram of the distributed process controller in an embodiment of the present invention.

In a hardware configuration of the distributed process controller 3 in the present embodiment, as shown in FIG. 4 in practice, the controller 3 is provided with the common platform which comprises a CPU section 30 for performing the control of the entire controller and an operational processing, a LAN interface section 31 for converting data signal from LAN into a form than can be processed in the distributed process controller 3, a terminal unit interface section 32, bus interface section 33 for connecting both interface sections 31 and 32 to CPU section 30, an external storage 34 and a CPU processing data memory section 35; with a memory section 36 housing therein exchangeable object sheet and event sheet; and with a memory section 37 housing therein a control algorithm sheet constituting the per-function package with the controlling and monitoring processes as the distributed process controller packaged.

The terminal unit interface section 32 is an interface that converts the data signal from the terminal unit 5 into the signal in the form capable of being processed in the distributed process controller 3, and is connected through the control signal line 4 to the terminal units 5 of the respective facilities. The LAN interface section 31 is connected through the information line 1 to the system management computer 2 and other distributed process controllers.

The distributed process controller 3 of the foregoing arrangement is made to perform a polling with respect to the terminal units 5 connected to the control signal line 4 through the terminal unit interface section 32, in accordance with the time division multiplex transmission signals including a predetermined signal format, and also to perform the data giving and receiving with other distributed process controllers or with the system management computer 3 through the LAN information line 1.

While in the above the present invention has been described from the view point of the configuration of the hardware and software, the description shall now be made in the followings from the view point of the data configuration and data flow.

Figure 5:
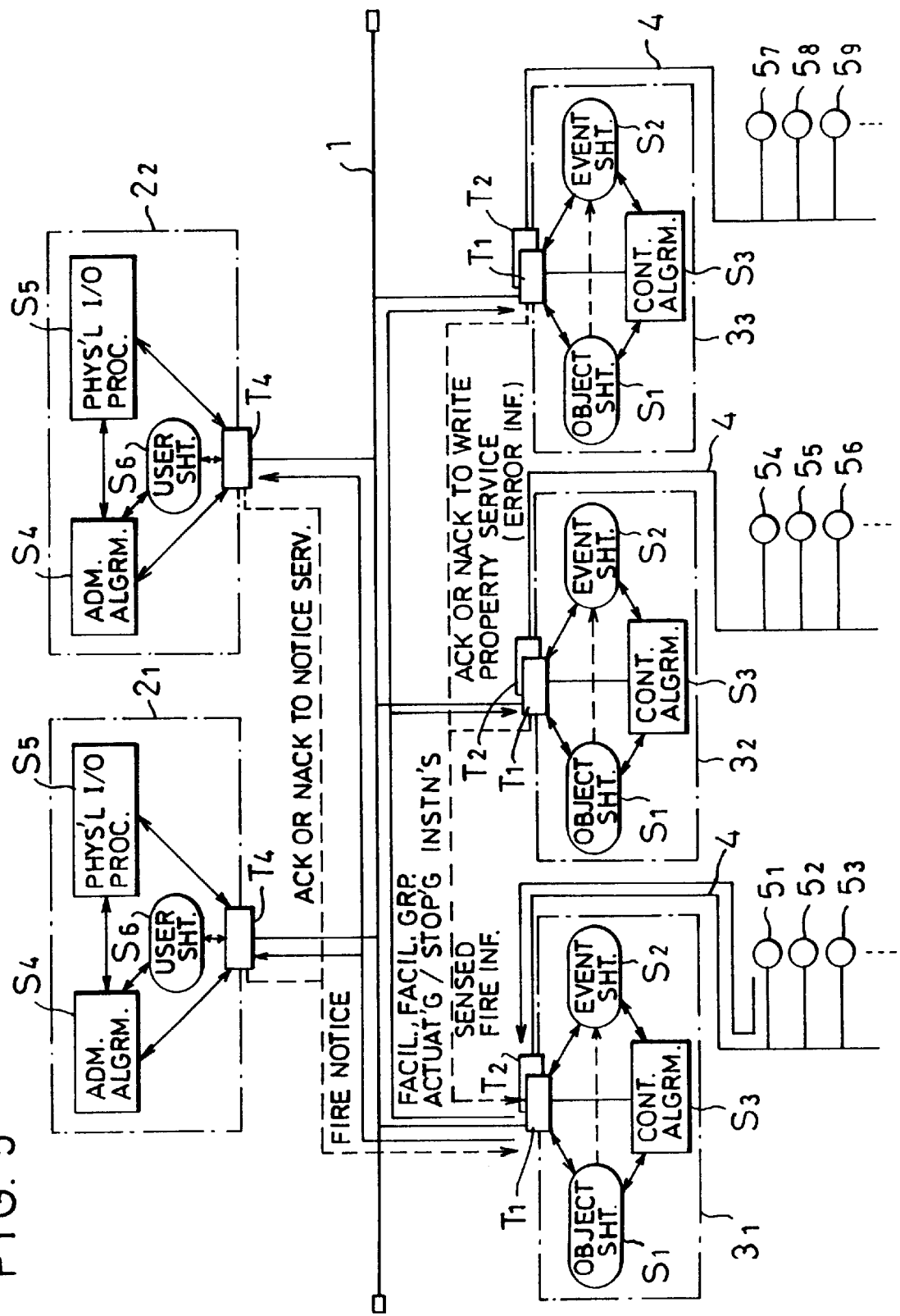
FIG. 5 is a conceptual block diagram showing the entire data configuration and data flow in the administration system.
Figure 6:
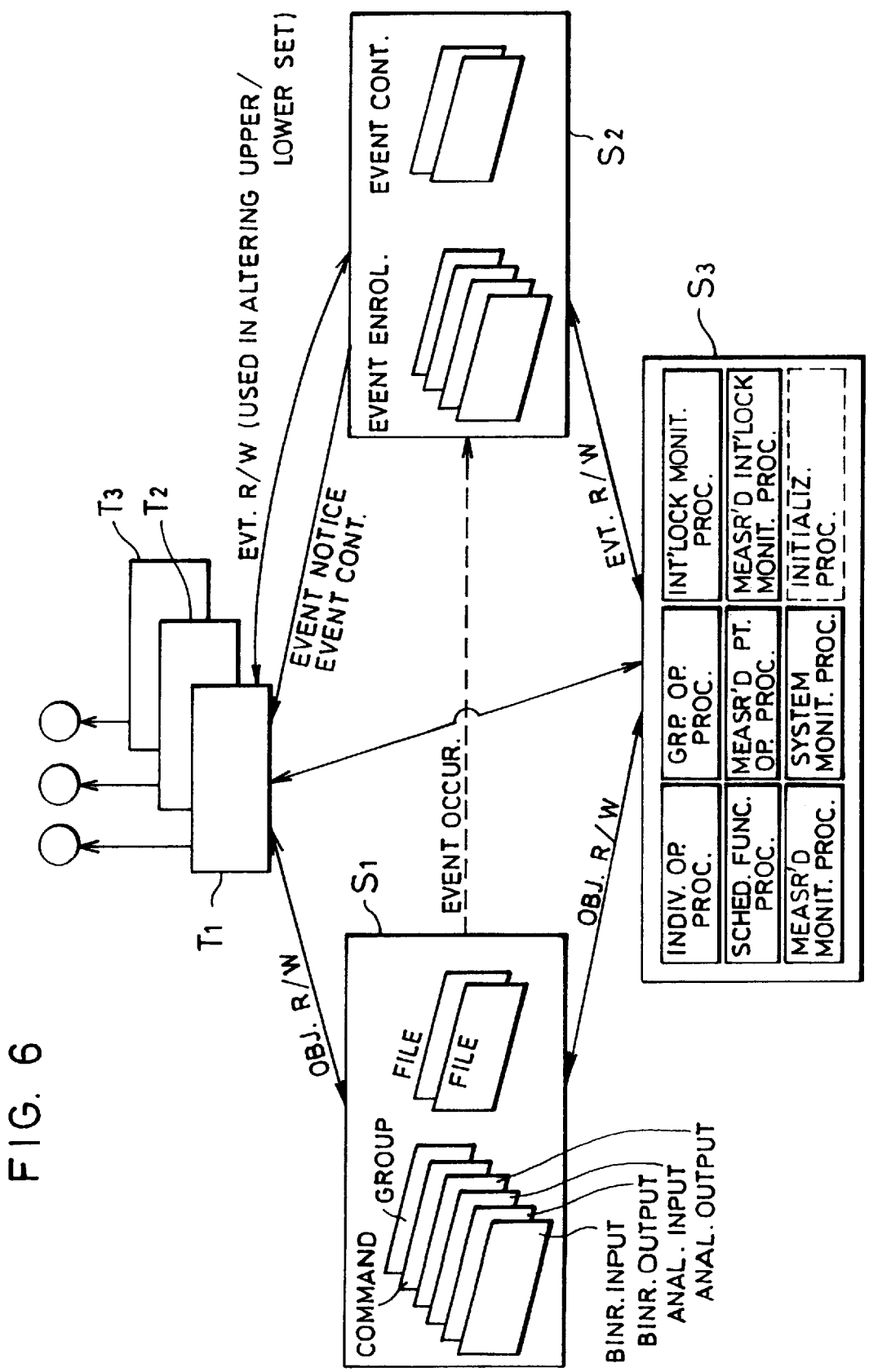
FIG. 6 is a conceptual diagram showing details of the data configuration and data flow in the distributed process controller.

Now, FIG. 5 shows in a conceptual block diagram the entire data organization in the present embodiment of the system of the present invention, in which the respective distributed process controllers $3_1$–$3_n$ include a packaged object sheet S1, event sheet S2, control algorithm sheet S3 in which a control algorithm is housed, communication service T1 with respect to LAN as a communication service step, and communication service T2 in the time division multiplex transmission series. Further, when the man machine interface device is added to the distributed process controller 3 for displaying and working the data with such device, a through service T3 for passing to the data an inner data as it is, as shown in FIG. 6.

On the other hand, the data organization of the respective system management computers $2_1$–$2_n$ comprises, as shown in FIG. 5, an administration algorithm sheet S4, physical I/O processing sheet S5, user sheet S6 and communication service T4 with respect to LAN. Referring more specifically to the data configuration of the distributed process controllers $3_1$–$3_n$ with reference to FIG. 6, the object sheet S1 comprises a group sheet in which state monitoring objects per installing position of the respective facilities as a unit, for example, are collected, a command sheet in which controllable objects per installing position of the respective facilities as a unit, for example, are collected, an analog input sheet housing therein state data of the terminals processing analog type data (analog inputs), an analog output sheet housing therein control command data for the terminals to which analog type control target values are provided for their control, a binary input sheet housing therein data showing the state whether or not the terminal is in operation (whether it is ON or OFF), a binary output sheet housing therein control command data whether or not the terminal is to be operated (to be turned ON or OFF), and is arranged to be capable of adding or deleting the corresponding packaged sheets in accordance with the facilities connected to the particular distributed process controller 3.

The event sheet S2 comprises sheets of event enrolment for registering to which parts the data transmission should be made through the LAN in correspondence to the particular event upon its occurrence, or an event control sheet in which objects for notification in correspondence to the particular event upon its occurrence. Further, the control algorithm sheet S3 comprises such processes packaged for every function as an individual operation process, group operation process, interlock monitoring process, schedule function process, measured point operation process, measured interlock monitoring process, measured data monitoring process, system monitoring process, initializing process and the like, and the distributed process controller 3 executes the monitoring control operation as based on the respective processes of this control algorithm sheet S3.

As in the above, the event sheet S2 comprises the respective sheets of the event control and event enrolment, and is provided for reading and writing the object data from the control algorithm sheet S3 to the object sheet 1, for reading and writing the event from the control algorithm sheet S3 to the event sheet S2, for notifying the event occurrence from the object sheet S1 to the event sheet S2, for reading and writing the object from the respective communication services T1–T3 to the object sheet S1, for reading and writing the upper and lower limits upon their alteration of set values of the data with respect to the event sheet S2, and for event-controlling relative to the event notification and interlock processing from the event sheet S2 to the respective communication services T1–T3. Further, between the control algorithm sheet S3 and the respective communication services T1–T3, the data transmission is performed through API.

The management algorithm sheet S4 comprises required functional sections for such system managements as individual management function, group management function, schedule management function, measuring and metering management function, initialization starting instructions with respect to the distributed process controllers, remote device management function for transferring programs and set data files accompanying the starting instructions, management computer interlocking function for interlocking process of mutual management computers in the case of the presence of a plurality of the system management computers 2, and object data management function for managing all objects (object identifiers) relating to the system. Further, the user sheet S6 comprises a schedule file, daily and monthly reports, such data managing files as demand file and so on, and such system setting files as remote device program file or network address managing file. Further, the physical I/O processing sheet S5 comprises sheets housing therein processing steps for such processes as those relative to a display and printer provided to the system management computer. The communication service T4 performs the event notification between the same and the management algorithm sheet S4 and receiving and giving results of read and write requests of the objects or receipt of the read and write requests of the objects, while, with respect to the user sheet S6, the ommunication service T4 reads and writes the respective files and cooperates therewith through API for the I/O processing with respect to the physical I/O processing sheet S5.

The system management computers $2_1$–$2_n$ and distributed process controllers $3_1$–$3_n$ which can be represented by the conceptual system diagram of the data transmission as has been described are mutually connected by means of LAN as shown in FIG. 1 to construct the building automation system, and perform the data giving and receiving through LAN mutually between the distributed process controllers $3_1$–$3_n$ or between the system management computers $2_1$–$2_n$ and the distributed process controllers $3_1$–$3_n$, with such communication format as shown in FIG. 8 employed.

Here, the communication format of FIG. 8 is constituted by a format classification (APDU type) showing the classification of such data as message, event, property and so on, service classification representing whether the data is confirmed data, non-confirmed data, decision feedback data or the like, demand indentifier consisting of the number for identifying a response to a demand (transmitting side allocates a sequential number and receiving side returns the response with the same number added), source object ID (such data as identification data or the like information of transmitter side device connected to LAN for transmitting the data), destination object ID, destination object ID (identification data and the like of the receiver side device), data length, facility classification data in the case of the distributed process controller 3, and facility state data of actual temperature, humidity, time, contact ON or OFF and the like state. In the source object ID, there are described such facility classification as the powering, lighting, fire alarm, air conditioning and the like, and such object identification as a zone in the building where the facility is located, a place where the facility is disposed, a building number in case a plurality of buildings are administrated in lump, temperature, himidity, contact state and the like.

Referring next to the flow of data in the present embodiment with reference to FIG. 5, it is assumed here that a fire detection information is provided from the monitoring terminal $5_1$ forming a fire sensor connected to the control signal like $4_1$ of the distributed process controller $3_1$ constituting a fire alarm control board, for example, the object sheet S1 corresponding to the fire detection data of the monitoring terminal $5_1$ which is the fire sensor generates a rewriting event, which is notified according to the destination (system management computers $2_1$ and $2_n$) registered in the event enrolment of the event sheet S2 related to the monitoring terminal $5_1$. In response to this notifying service, ACK or NACK is returned from the system management computer $2_1$ as a master and the system management computer $2_2$ as a slave, for example, to the distributed process controller $3_1$. Whether or not this notification is utilized here is decided by the own discrimination on the receiving side (the system management computer $2_1$, $2_2$), and the notifying side (the distributed process controller $3_1$) performs only the process instructed by the event enrolment. Further, operation starting or stopping instructions of facilities are notified to the object of operation registered in the event control of the event sheet S2 related to the monitoring terminal $5_1$ (in this case, the objects of command or binary output of the distributed process controllers $3_2$ and $3_3$ forming the facility controlling board).

Consequently, the distributed process controllers $3_2$ and $3_3$ rewrite the objects of corresponding operation, that is, a write property service is performed, and an ACK with respect to this processing is returned. In the event when no object of the command or binary output is present in the destination of the operation starting or stopping instructions, the notification will only be an error in the property setting service. In order to cope with such an event, a file object in which a notifying destination of the service error in such internal interlocking processing is registered should only be provided in the object sheet. Normally, the system management computer or the like is registered as the notifying destination.

In this manner, the rewriting of the object sheet S1, event notification and event control (such interlocked processing as the operation starting or stopping instructions as in the above) are carried out in the distributed process controller $3_3$ of the notification source, on the basis of the event sheet S2, whether or not the received data is utilized is determined at the distributed process controllers $3_2$, $3_3$ of the notifying destination with its own judgement, and whether or not the rewriting of the object is processed is determined by the presence or absence of the corresponding object. In expanding the system, therefore, the object sheet S1 corresponding to contents of the expanded control and monitoring of the distributed process controller 3 is added, the notifying destination and the like are registered in the event sheet S2, and a package of corresponding process to the expanded function is added to the control algorithm sheet S3. Further, by the employment of the packaged object sheet S1 and communication service T1, mutual interaction and cooperation can be performed at a high efficiency.

In the terminal unit interface section 32, on the other hand, an arrangement for establishing the relationship of the various object sheets S1 to the terminal information at the terminals 5 of physical building administration facilities corresponding to the various object sheets S1, through the control signal line 4 becomes necessary before building up the system, so that this relationship establishment is made by means of a down load processing from the system management computers $2_1$–$2_n$ through LAN, and the result of this established relationship is housed in an object data-to-physical data converting table 32a of FIG. 8.

Figure 11:
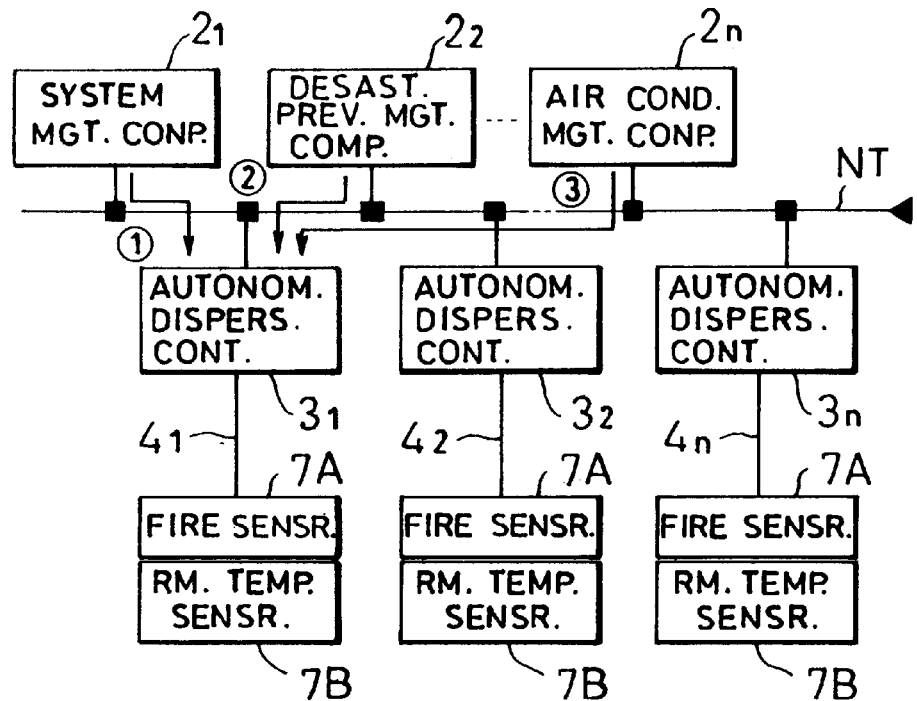
FIGS. 11 and 12 are schematic explanatory block diagrams for the operation of the embodiment of FIG. 10 according to the present invention.
Figure 12:
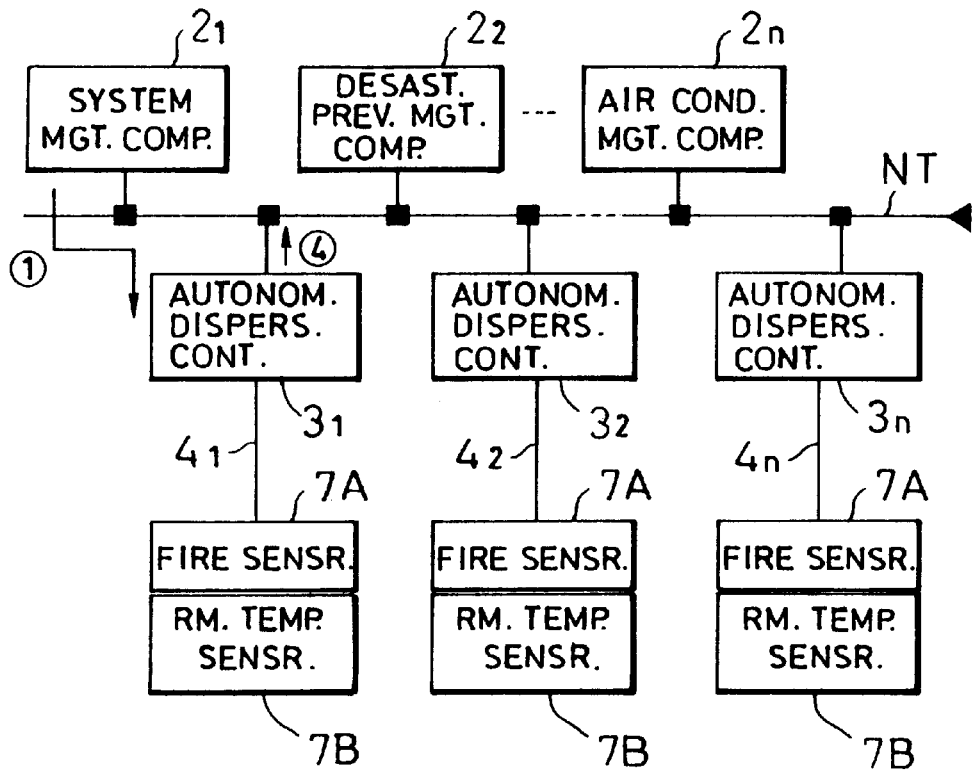

Embodiment 2:

FIGS. 11 and 12 show a conceptual system configuration in a second embodiment of the invention, in which one $2_1$ of the system management computers $2_1$–$2_n$ connected to the network NT is constituted as a computer for the management of the entire building automation system, while another system management computer $2_2$ is constituted as a fire alarm management computer for managing the building managing facilities coping with the fire alarming system, and another system management computer $2_n$ is constituted as an air conditioning management computer for managing the facilities coping with the air conditioning system.

To the respective distributed process controllers $3_1$–$3_n$, a fire alarm sensor 7A or a room temperature sensor 7B is connected through each of the control signal lines $4_1$–$4_n$.

The fire sensor 7A here is to be provided with functions as the sensor of fire occurrence and as a terminal of the respective distributed process controllers $3_1$–$3_n$. Similarly, the room temperature sonsor 7B is provided with functions as the temperature sensor for sensing room temperatures and as a terminal of the respective distributed process controllers $3_1$–$3_n$.

Now, upon the rising of the system, the system management computer $2_1$ sets in the respective distributed process controllers $3_1$–$3_n$, in order to discriminate the data of the fire sensor 7A, room temperature sensor 7B or building management facilities 40 connected to the controllers as managing point, the physical address of the managing point, input output port number, channel number, facility classification data and event conditions, and these data are caused to be stored in the memories of the respective distributed process controllers $3_1$–$3_n$. Here, respective data are so set that such facility classification data as [01] denoting as being a fire alarm facility is set for the fire sensor 7A, and such facility classification data as [02] denoting as being an air conditioning facility is set for the room temperature sensor 7B. This operation corresponds to a flow denoted by an arrow ① in FIGS. 11 and 12.

Thereafter, the fire alarm management computer $2_2$ reads, upon rising of its own system, only the data setting the facility classification (=01) of the fire alarm facilities out of the object ID of the distributed process controllers $3_1$–$3_n$ to prepare a table, and then executes the respective functions of the setting, monitoring, controlling and sensing with respect to the io facility classification data (=01) of the fire alarm facilities, so as to be able to function as a fire alarm receiver. This operation corresponds to a flow denoted by an arrow ② in FIG. 11.

Further, the air conditioning management computer 2 reads, upon rising of its own system, only the data setting the facility classification (=02) of the air conditioning facilities out of the object ID of the distributed process controllers $3_1$–$3_n$ to prepare a table, and then executes the respective functions of the setting, monitoring, controlling and sensing with respect to the facility classification data (=02) of the fire alarm facilities, so as to be able to function as a fire alarm monitoring board. This operation corresponds to a flow shown by an arrow ③ in FIG. 11. Upon reception of any change in the monitoring data from the fire sensor 7A or the room temperature sensor 7B, the distributed process controllers $3_1$–$3_n$ transmit the data to the network NT in a standardized format (FIG. 13) with the facility classification data added. In the case of the monitoring data from the fire sensor 7A, for example, the same is transmitted with the addition of the facility classification data (=01). This operation corresponds to a flow denoted by an arrow ④ in FIG. 12. In this case, the transmitted date are taken up by the fire alarm management computer $2_2$ as the data of the fire alarming system under the own management of this computer, but are ignored by the air conditioning management computer $2_3$ as being the data irrespective of the air conditioning system. Similarly, in the case of the monitoring data from the room temperature sensor 7B, the same is transmitted with an addition of the facility classification data (=02). In this case, the air conditioning management computer $2_3$ takes up the data as being ones of the air conditioning system under its own management, but the fire alarm management computer $2_2$ ignores the data as being irrespective of the fire alarming system.

In this way, the output data from the distributed process controllers $3_1$–$3_n$ to the network NT side are grasped as the objects, and these objects are classified with respect to every facility classification, so that the management can be performed in correspondence to every one of the classified facilities, the control can be decentralized, while the management can be added with the system management computer added in correspondence to the usage so as to allow the addition to be simple, and the system configuration with such small size management computer as to be per usage is made easier.

Figure 14:
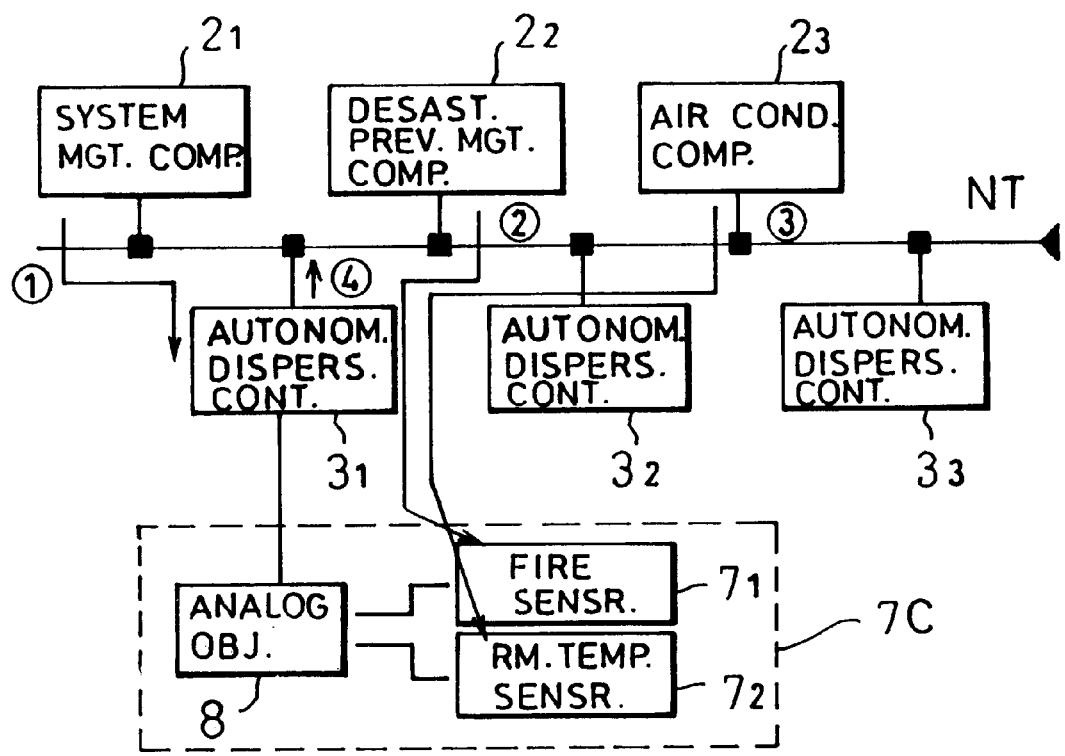
FIG. 14 is a schematic explanatory block diagram showing still another embodiment according to the present invention.

Embodiment 3:

While in the foregoing Embodiment 2 the fire sensor 7A and room temperature sensor 7B are provided separately, the system in the present Embodiment 3 employs a temperature monitoring sensor 7C in common for sensing the fire and room temperature, in which, upon rising of the system, the system management computer $2_1$ allocates the sensor input of the temperature monitoring sensor 7C including the terminal connected, for example, to the distributed process controller $3_1$. This operation corresponds to a flow shown by an arrow ① in FIG. 14.

Then the fire alarm management computer $2_2$ regards the sensor 7C as a fire sensor $7_1$ employed for judging any fire occurrence, and sets [01] as the facility classification to an analog input object 8 of the sensor $7_1$. This operation corresponds to a flow shown by an arrow ② in FIG. 14. On the other hand, the air conditioning management computer $2_3$ sets [02] as the facility classification to the analog input object 8 of the sensor 7C regarding it as the room temperature sensor 7B to be used for judging the air conditioning control. this operation corresponds to a flow shown by an arrow ③ in FIG. 14.

The distributed process controllers $3_1$–$3_n$ are respectively provided with a memory for storing contents of these set facility classifications in correspondence to the objects, and the distributed process controller $3_1$ registers the set contents in the object sheet corresponding to the analog input object 8. In providing the data of the temperature sensor 7C as an output to the network NT, the distributed process controller $3_1$ provides two outputs. That is, one of the data to which [01] has been set as the facility classification, for example, is provided and, the other of data to which [02] has been set as the facility classification is provided respectively as the output. This operation corresponds to a flow shown by an arrow 4 in FIG. 14.

At the fire alarm management computer $2_2$, therefore, the data including the facility classification data [01] are taken up to be processed and, at the air conditioning management computer $2_3$, the data including the facility classification data [02] are taken up to be processed.

That is, in the present Embodiment 3, the data provided as outputs from the distributed process controllers $3_1$–$3_n$ to the network NT are grasped as the objects, and treated to have respectively a plurality of meanings, and it is enabled to employ one sensor input for a plurality of purposes.

Embodiment 4:

In the automation system based on the data of the directivity to the object in the present invention, there is an advantage that the system can be easily expanded only by adding the object sheet to the system.

For this purpose, the source object ID as shown in the format of FIG. 8 has, in addition to the identifying data information of the device on the data transmitting side (the device on the network), information on the zone and position in the building at which the facilities are disposed, object identifying data and the like for managing such object data as the building number information in the event of administration of the plurality of buildings, temperature, humidity, contact state and the like. Further, in the terminal classification data, an information denoting whether one temperature information is used in the air conditioning managing system or in the fire alarm managing system is written.

The arrangement (Embodiment 1) for attaining the relationship of the various object sheets S1 housing therein the data as has been described, to the terminal data in the terminals 5 for the physical building facilities and corresponding to the sheets will become a complicated work when the object number is large, specifically when the arrangement is made by the down load processing from the system management computers $2_1$–$2_n$ through the network 1.

Here, according to the present embodiment, the arrangement is so made that a socalled plug-and-play function is realized by arranging the distributed process controllers 3 upon building up of the system so as to read the terminal information not in the down load from the system management computers 2 but in data-up-load from the terminals 5, whereby the complicated down load processing at the initial stage is eliminated and the terminal data can be registered in the distributed process controllers 3 only by connecting thereto the terminals 5.

That is, in the present embodiment, the terminal 5 is provided as shown in FIG. 9 with an object data information table 51 on which the object ID corresponding to physical number (address) and facility classification are registerable by means of an external tool 50.

Other than this object data information table 51, the terminal 5 comprises a local transmission drive circuit 52 for performing the transmission and reception of the communication data in the time division multiplex transmission system, an input output interface circuit 53 for interfacing (such as input and output of contacts and analog values) with such facilities the facility equipment as the load, actuator or such sensors as the fire sensor, temperature sensor and the like, an address switch 54 setting the physical address of the terminal 5, and a terminal function processing section 55 having such functions that the input data from the facilities 60 into the communication data of the time division multiplex, that the data requested by the superior ranked distributed process controller 3 are returned through the local transmission drive circuit 52 in the case when the terminal address of the request coincides with the set value of the address switch 54, and that the output data are provided to the facilities 60 on the basis of the control data contained in the communication data received in the case when the terminal address in the communication data coincides with the set value of the address switch 54.

The foregoing tool 50 is to set and rewrite the object information, and is constituted by a personal computer or the like. In the present embodiment, the object ID and facility classification data are preliminarily registered in the object data information table 51 of the terminal 5 connected to the system, by means of the tool 50.

Upon starting of the system, the distributed process controller 3 calls the respective terminals 5 to have the registered object ID and facility data returned and registered in the object data-physical data converting table 32a provided to the terminal unit interface section 32, as related to their physical number (address). That is, it is made possible to link the connected terminal 5 to the data base of the directivity to objects.

After this registering process, the system shifts into its normal operation by causing such actual data as the temperature, contact-state or the like data returned from the terminals 5.

Figure 10:
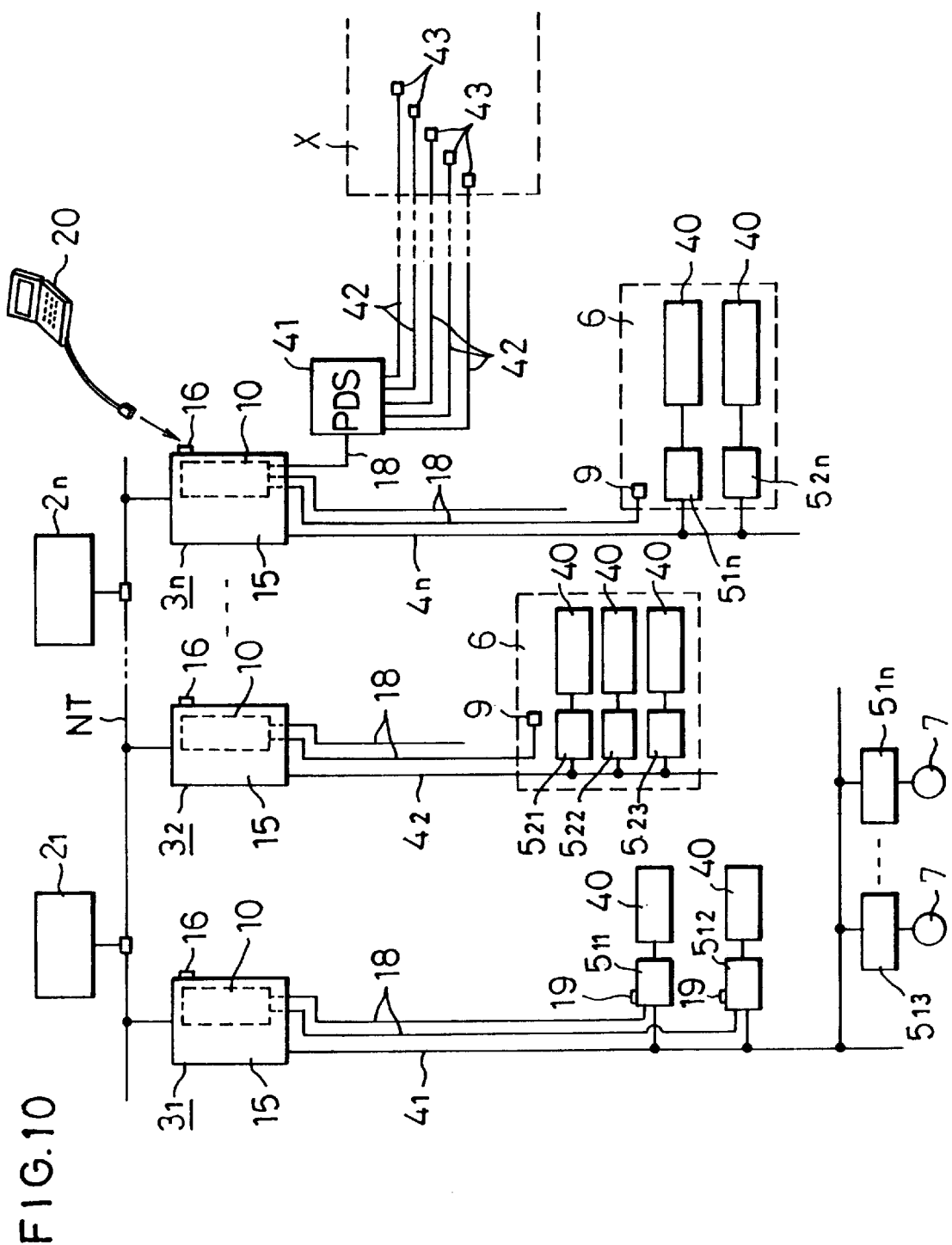
FIG. 10 is an entire system configuration diagram in another embodiment according to the present invention.

Embodiment 5:

Referring next to the entire configuration of the building automation system in another aspect according to the present invention with reference to FIG. 10, in the system of which aspect, similarly to the system of FIG. 1A, a plurality of the system management computers $2_1$–$2_n$ employing the work station or the like, and a plurality of the distributed process computers $3_1$–$3_n$ are connected to the signal line of the network NT forming the LAN with such proper protocol as TCP/IP. To the respective distributed process controllers $3_1$–$3_n$, there are connected through the control signal lines $4_1$–$4_n$, the series of the terminals $5_{11}$–$5_{1n}$, $5_{21}$–$5_{2n}$ ... $5_{n1}$–$5_{nn}$ are connected, to which terminals such building facilities 40 as the lighting, fire alarm, air-conditioning, security, powering and the like facilities are connected, and the distributed process controllers $3_1$–$3_n$ are arranged for performing the monitoring control and setting of the respective building managing facilities 40 through the terminals $5_{11}$–$5_{1n}$, $5_{21}$–$5_{2n}$ and $5_{n1}$–$5_{nn}$.

In each distributed process controller 3, a controller body 15 has a moduler jack 16 connected to the information line NT and also to a hub board 10 in the body 15, so that such terminal device as a portable personal computer 20 can be connected to the information line of the network NT through the hub board 10 and moduler jack 16.

Further, the hub board 10 is provided with a plurality of ports, a plurality of information lines 18 are led out of these ports, and these lines 18 are connected at their terminal ends to modular jacks 9 provided to remote stations 6 and to modular jacks 19 provided to the terminals $5_{11}$–$5_{1n}$. By connecting the portable personal computers 20 to these modular jacks 9 and 19, the computers 20 can be connected to the information line of the network NT.

To the information lines 18 led out of one of the distributed process controllers, for example, the controller $3_n$, a distributor 41 having a function of branching the information line is connected, and further thus branched information lines 42 from the distributor 41 are provided below floor board X and provided at their terminating ends respectively with a modular jack 43, so that the portable personal computer 20 may also be connected by the modular jacks 43 to the network NT.

Here, the distributed process controllers $3_1$–$3_n$ are able to perform the data giving and receiving with respect to the system management computers $2_1$–$2_n$ and other distributed process controllers through the network NT. The system is also provided with the control operation processing function to be capable of monitoring, controlling and setting the respective building managing facilities 40 and sensors 7 connected, by giving and receiving the data between the respective distributed process controllers $3_1$–$3_n$ and the respective terminals $5_{11}$–$5_{1n}$, $5_{21}$–$5_{2n}$ and $5_{n1}$–$5_{nn}$ through the control signal lines $4_1$–$4_n$ respectively connected to the controllers, by means of the time division multiplex transmission signals. Further, the distributed process controllers $3_1$–$3_n$ are respectively provided with a memory for housing the set data required for the controller, and a memory for housing required program for the operation as the distributed process controller.

The remote station 6 incorporating therein the terminals $5_{21}$–$5_{2n}$ or $5_{n1}$–$5_{nn}$ is constituted in the form of a board, to which the terminals 5 and terminal bases for connection of the respective management facilities 40 to the terminals 5 are mounted and the modular jack 9 is provided for external access.

The terminals $5_{11}$–$5_{1n}$ are constituted by a signal receiving section for receiving the transmission signals from the distributed process controllers $3_1$–$3_n$ through the control signal lines $4_1$–$4_n$, a signal returning circuit for returning the reply signal to the distributed process controllers 3 through the control signal lines 4, an address setting section for setting inherent addresses to the terminal, a signal processing circuit, a pulse conversion circuit, and a monitoring input circuit. In this case, the arrangement is so made that the received data are taken in the terminal when the received address data of the transmission signals coincides with the set address of the address setting section, and that, as based on the data taken in, the control of the respective building facilities 40, taking up of the state signals from the connected sensors 7 as the monitored data, and the returning of the monitored data to the distributed process controllers $3_1$–$3_n$ as the return signals thereto and so on are performed.

Figures 13, 13A:
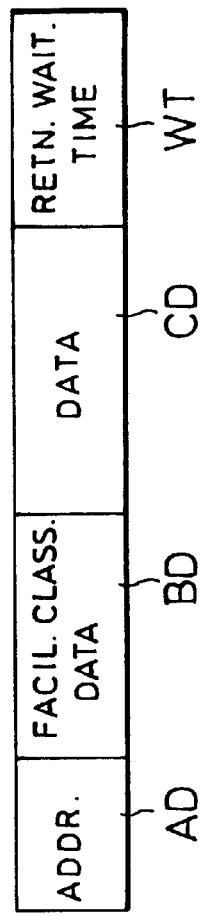
FIGS. 13 and 13A are explanatory views for the data formation in the embodiment of FIG. 10.

Now, the distributed process controllers $3_1$–$3_n$ respectively perform the polling with respect to the terminals 5 connected to each of the control signal lines $4_1$–$4_n$ with such transmission signals as shown in FIG. 13A employed. While in the drawing a starting signal and an end signal are not shown, these signals are present in practice as will be appreciated. That is, the transmission signals are signals of voltage mode, including address data AD of the terminals, facility classifying data BD, data CD showing contents of the control, and reply period WT. At the terminal 5 which has received such transmission signals, the control operation is performed with the data CD taken in upon coincidence of the own address and classification with those of the signals, and the monitored data are returned in a current mode during the reply period WT next to the data CD.

A signal format at the network NT comprises, as shown in FIG. 13, a classification of type, classification of service, request factor, source address, destination address, data length, facility classification data, and control data, so that the data giving and receiving will be performed between the distributed process controllers $3_1$–$3_n$ and the system management computers $2_1$–$2_n$ and mutually between the respective distributed process controllers $3_1$–$3_n$, with the above signal format utilized.

With the use of the signal format of FIG. 13, therefore, it is enabled to perform the communication with the portable personal computer 20, similarly to the system management computers $2_1$–$2_n$, and, provided that a software for use in the facility monitoring operation capable of processing the data is housed, it is made possible to perform the data giving and receiving between the portable personal computer 20 and the distributed process controllers $3_1$–$3_n$, similarly to the system management computers $2_1$–$2_n$, only by connecting a network communication terminal provided to the portable personal computer 20 to the modular jack 16 of the distributed process controllers $3_1$–$3_n$, the modular jack 19 provided to the terminals $5_{11}$–$5_{nn}$, the modular jack 9 of the remote stations 6, or the modular jack 43 of the information lines 42 provided below the floor.

In the followings, the operation of the distributed process controller 3 in the aspect of FIG. 10 shall be described. First, the distributed process controller 3 executes the initialization of the common platform upon the rise, and investigates if any of the various events has been generated. In the absence of the event, the present values (state data) of the respective building facilities 40 are requested, and the present value data are renewed by the data returned. Thus, the distributed process controller 3 is arranged to repeatedly perform the investigation of the generation of the various events, request for the present values and their renewal so long as the various events do not generate.

Next, the operation upon generation of the various events shall be described. In an event where an interruption from the LAN interface section 31 incorporated takes place and the request for the setting of control and management is received from the system management computer 2 or the portable personal computer 20, or in an event where an interruption from the terminal unit interface section 32 incorporated takes place and a trouble notified from the building management facilities 40 is detected, or in an event where an interruption takes place from an inner timer of the CPU section 30 performing the operational process of the distributed process controllers $3_1$–$3_n$ and the time is detected, an event is issued in these respective cases (see also FIG. 4).

In the case when the event has occurred and this event is a request for setting from the LAN interface section 31, the CPU section 30 provides a command to the terminal unit interface section 32 so that an appointed one of the facilities 40 will set the data, and rewrites the internally set data. When the event is a request for control from the LAN interface section, the CPU section 30 provides a command to the terminal unit interface section for the ON/OFF control of an appointed one of the facilities 40, and rewrites the incorporated control data. When the event is a request for monitoring from the LAN interface section, further, the CPU section reads the present value data in an appointed one of the facilities 40, and returns the data read out to the LAN interface section.

Next, in the case when the event is an interruption from the terminal unit interface section 32, the arrangement is so made that the CPU section 30 reads the sensed data out of the sensor 7 and causes, if necessary, an automatic notification to be made through the LAN interface section to the system management computers $2_1$–$2_n$.

In the case when the event is due to an interruption from the inner timer of the CPU section 30, the time of the inner timer is checked by the CPU section, such program as the schedule control or the like is executed, and an inner event is issued when the control is set at the particular time.

What is claimed is:

1. A building automation system comprising a system management computer, distributed process controllers connected through a network to the system management computer, and terminal units connected to the distributed process controllers through control signal lines, the terminal units including controlling terminals for controlling facility loads and monitoring terminals for monitoring states of such input elements as sensors and switches;

the distributed process controllers respectively comprising a common platform in which programs capable of operating and controlling hardwares are standardized, a common function package having a function of delivering data to one of object data, event data and application program performing a processing on the basis of the one of the object and event data, and a per-usage package comprising application programs respectively for every usage and exchangeable in accordance with the usage and scale of the system;

wherein the distributed process controllers perform the monitoring and controlling of the respective terminals, and giving and reception of monitoring data and controlling data on the facility loads through the network between the system management computer and the distributed process controllers or mutually between the respective distributed process controllers.

2. The system according to claim 1 wherein the terminals connected to the distributed process controllers are arranged to have an information to be sent to the distributed process controllers upon rising of the system for causing the particular terminal which has sent the information to be linked in the distributed process controller to a data base of a directivity to the object.

3. A building automation system comprising system management computer, distributed process controllers connected through a network to the system management computer, and terminal units connected to the distributed process controllers through control signal lines, the terminal units including controlling terminals for controlling facility loads and monitoring terminals for monitoring states of such input elements as sensors and switches;

the distributed process controllers respectively including packaged object sheets, event sheets, and control algorithm sheets in which controlling processes are capsulized for every one of functions, the object sheets housing therein such objects as monitoring data as to the terminals and setting data for controlling data, respective contents in the object sheets being rewritten in accordance with any change in the state of the terminals, the monitoring data and controlling data in accordance with the change in the terminals being transmitted through the network to other distributed process controllers and system management computers registered in the event sheets as notifying destination, and, in the presence of the object sheet corresponding to the data received through the network, this object sheet being rewritten to have an event generated, to cause a corresponding one of the terminals to perform corresponding ones of the monitoring and controlling; and the distributed process controllers performing the monitoring and controlling of the respective terminals, and giving and reception of monitoring data and controlling data on the facility laods through the network between the system management computer and the distributed process controllers or mutually between the respective distributed process controllers.

4. The system according to claim 2 wherein the terminals connected to the distributed process controllers are arranged to have an information to be sent to the distributed process controllers upon rising of the system for causing the particular terminal which has sent the information to be linked in the distributed process controller to a data base of a directivity to the object.

5. A building auotmation system comprising:

a plurality of system management computers;

a plurality of distributed process controllers connected through a network to the respective system management computers;

means for connecting building facilities to the respective distributed process controllers;

means for setting, from a predetermined one of the system management computers, individual discrimination data and facility classification data at the respective corresponding distributed process controllers and at management points of the building facilities connected to the distributed process controllers, and storing the set data in memories of the distributed process controllers;

means for causing the system management computers which manage their own building facilities to provide a command to the distributed process controller for having the data at the management point of the set facility classification of the objective building facilities transmitted; and means for managing the respective building facilities on the basis of the facility classification data being sent from the respective distributed process controllers in correspondence to the respective managing points, after providing to the classification data a required relationship for the building administration by means of the data transmitted from the distributed process controller on the basis of the command.

6. The system according to claim 5 which further comprises means for setting a plurality of types of the facility classifications with respect to each sensor provided to the management point of the building facilities.

* * * * *